United States Patent
Boyle et al.

(10) Patent No.: US 7,401,677 B2
(45) Date of Patent: Jul. 22, 2008

(54) SELF-CENTERING STEERING SYSTEM

(75) Inventors: Kevin E. Boyle, Lafayette, IN (US); Terry D. Carson, West Lafayette, IN (US); Mark A. Cartwright, West Lafayette, IN (US); Stephen J. Green, Clarkston, MI (US); Kurt Achenbach, White Lake, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/075,669

(22) Filed: Feb. 13, 2002

(65) Prior Publication Data

US 2003/0150667 A1 Aug. 14, 2003

(51) Int. Cl.
*B62D 5/04* (2006.01)
*B62D 3/00* (2006.01)
(52) U.S. Cl. .................. 180/444; 180/400; 280/89.11
(58) Field of Classification Search .......... 180/400, 180/402, 435, 439, 443, 444, 445, 447; 280/89.11
See application file for complete search history.

(56) References Cited

U.S. PATENT DOCUMENTS

| | | | |
|---|---|---|---|
| 1,361,047 A | 12/1920 | Gregory et al. | |
| 2,086,814 A | 7/1937 | McCollum | |
| 2,709,495 A | 5/1955 | Vickers | |
| 2,728,404 A | 12/1955 | Peterson | |
| 3,207,254 A | 9/1965 | De Venel | |
| 3,757,886 A | 9/1973 | Hirao et al. | |
| 3,833,080 A | 9/1974 | Lemmon | |
| 4,102,427 A | 7/1978 | Sabec | |
| 4,319,654 A | 3/1982 | Ujita | |
| 4,364,578 A | 12/1982 | Ikeda et al. | |
| 4,645,025 A * | 2/1987 | Ohe et al. ................... | 180/412 |
| 4,671,523 A * | 6/1987 | Naumann ................... | 180/412 |
| 4,683,971 A | 8/1987 | Westercamp et al. | |
| 4,694,925 A | 9/1987 | Roberts | |
| 4,811,813 A | 3/1989 | Hovanchak | |
| 4,815,552 A * | 3/1989 | James ........................ | 180/400 |
| 4,837,692 A | 6/1989 | Shimizu | |
| 4,856,606 A | 8/1989 | Brown | |
| 4,930,592 A * | 6/1990 | Ohmura ...................... | 180/445 |
| 4,953,648 A * | 9/1990 | Ohmura ...................... | 180/445 |
| 4,978,131 A | 12/1990 | Edahiro et al. | |

(Continued)

FOREIGN PATENT DOCUMENTS

DE 4111799 10/1992

(Continued)

*Primary Examiner*—Lesley D. Morris
*Assistant Examiner*—Daniel Yeagley
(74) *Attorney, Agent, or Firm*—Tarolli, Sundheim, Covell & Tummino LLP

(57) ABSTRACT

A steering system (10) for a vehicle (16) comprises a housing (20) having first and second end portions (32, 34) and an intermediate portion (50). A steering member (66) is supported for axial movement in the housing (20). A piston (100) fixed for movement with the steering member (66) has opposite end faces (104, 106). First and second springs (130, 132) engage the end faces (104, 106) of the piston (100) and bias the piston and thereby the steering member (66) in first and second axial directions toward a straight ahead position. Steering linkage (124, 126) connected with the piston member (100) transmits movement of the piston member (100) to steerable wheels (12, 14) of the vehicle.

21 Claims, 8 Drawing Sheets

U.S. PATENT DOCUMENTS

| | | | |
|---|---|---|---|
| 5,003,480 A * | 3/1991 | Mori et al. | 701/42 |
| 5,007,494 A * | 4/1991 | Ohmura et al. | 180/445 |
| 5,040,631 A | 8/1991 | Lang et al. | |
| 5,080,185 A | 1/1992 | Kondo et al. | |
| 5,129,474 A | 7/1992 | Rauter et al. | |
| 5,219,176 A | 6/1993 | Mitchell | |
| 5,236,057 A * | 8/1993 | Takehara et al. | 180/414 |
| 5,456,330 A | 10/1995 | Kojima et al. | |
| 5,508,921 A | 4/1996 | Chikuma et al. | |
| 5,636,857 A | 6/1997 | Tandy, Jr. et al. | |
| 5,820,147 A | 10/1998 | Rohweder et al. | |
| 5,954,774 A * | 9/1999 | Jung et al. | 701/41 |
| 6,019,026 A | 2/2000 | Williams et al. | |
| 6,098,742 A * | 8/2000 | Cartwright | 180/435 |
| 6,202,781 B1 | 3/2001 | Ima | |
| 6,616,156 B1 | 9/2003 | Dudding et al. | |
| 2003/0107200 A1 * | 6/2003 | Huang et al. | 280/93.515 |

FOREIGN PATENT DOCUMENTS

| | | |
|---|---|---|
| DE | 4111799 A1 | 10/1992 |
| JP | 04278881 A * | 10/1992 |

* cited by examiner

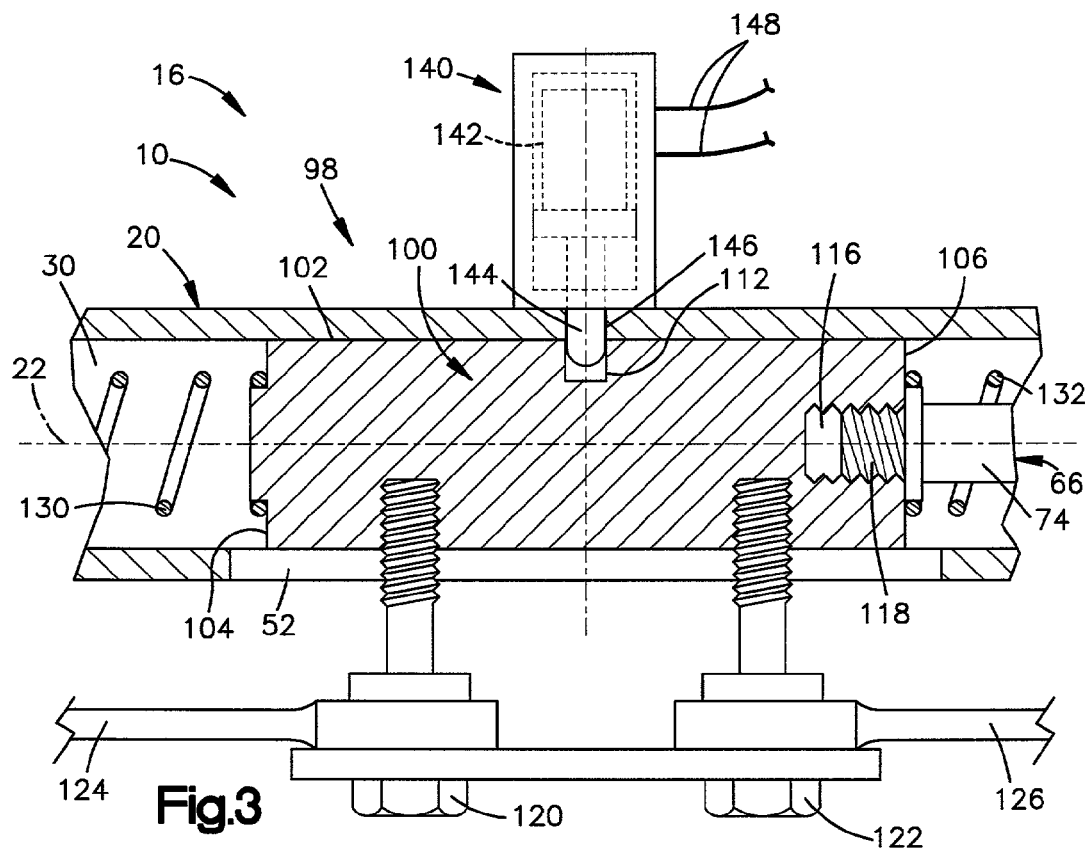
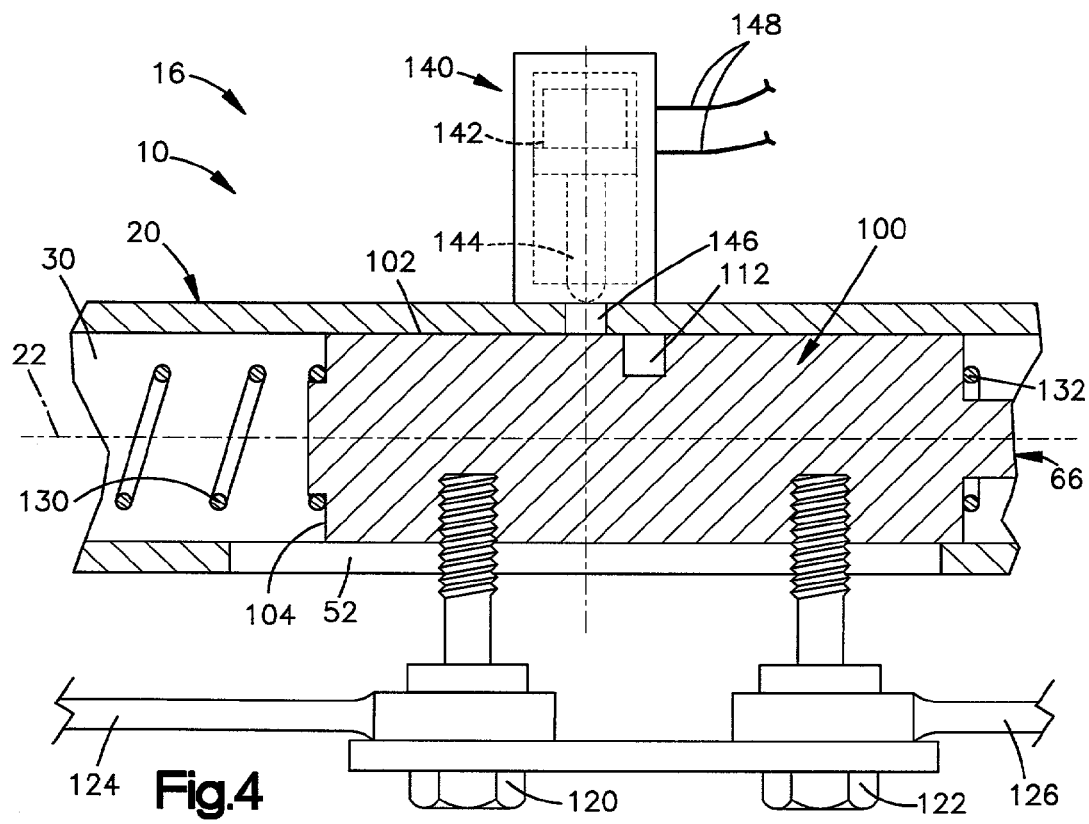

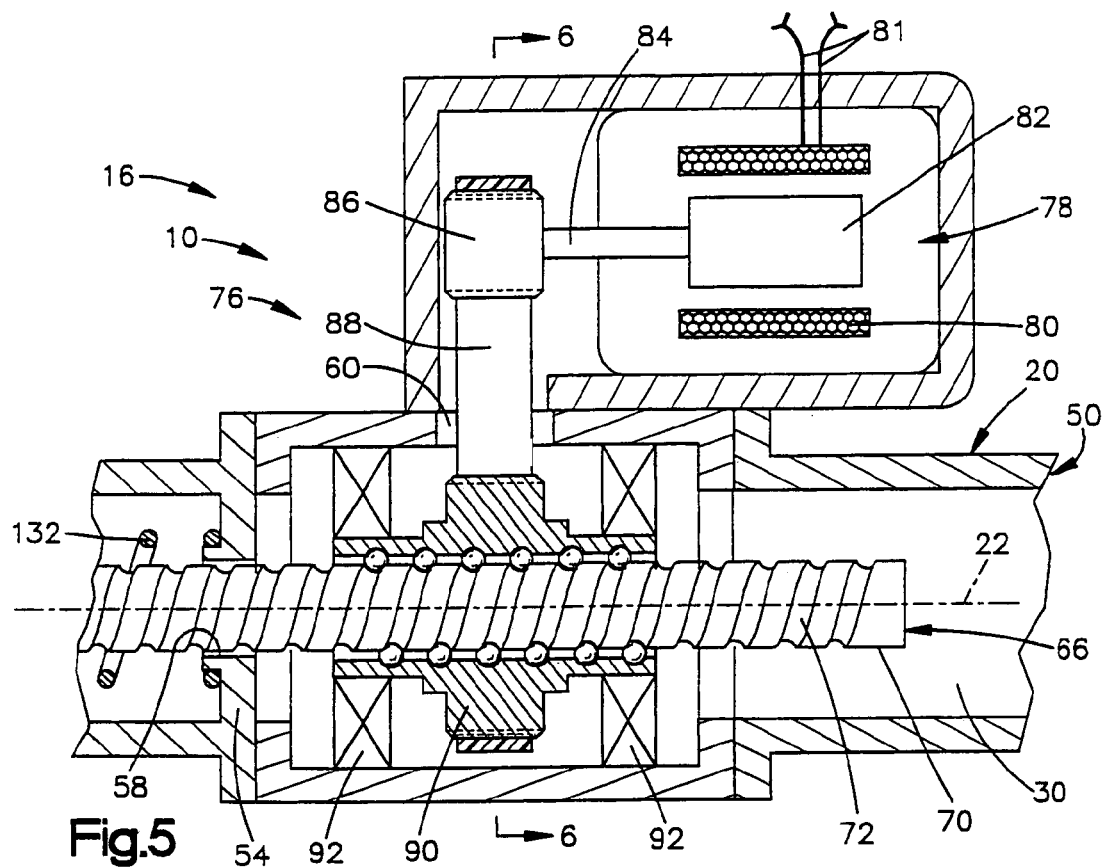
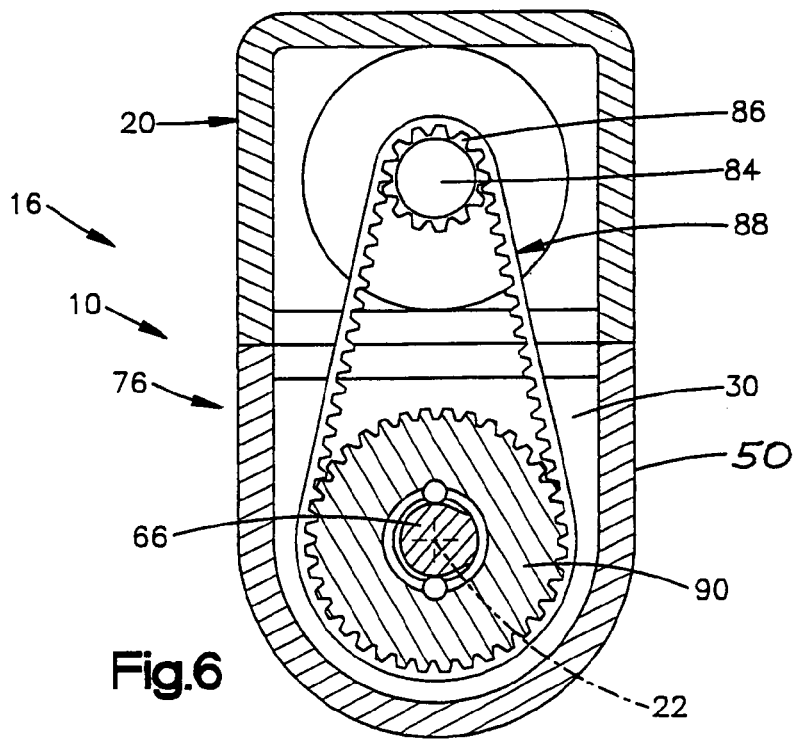

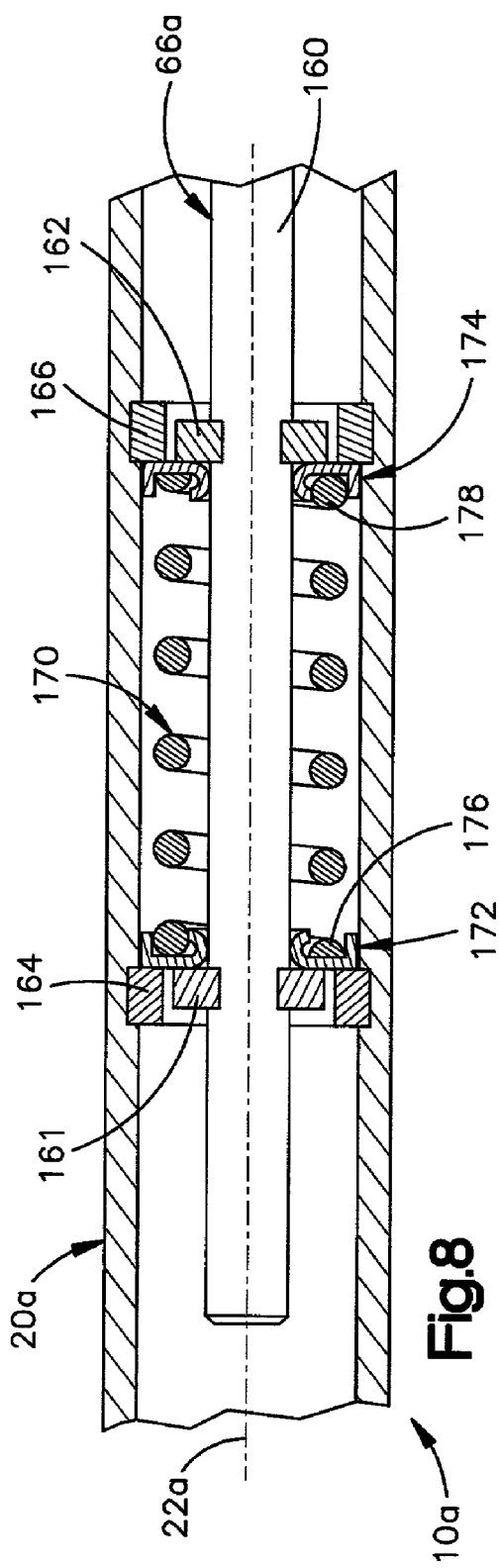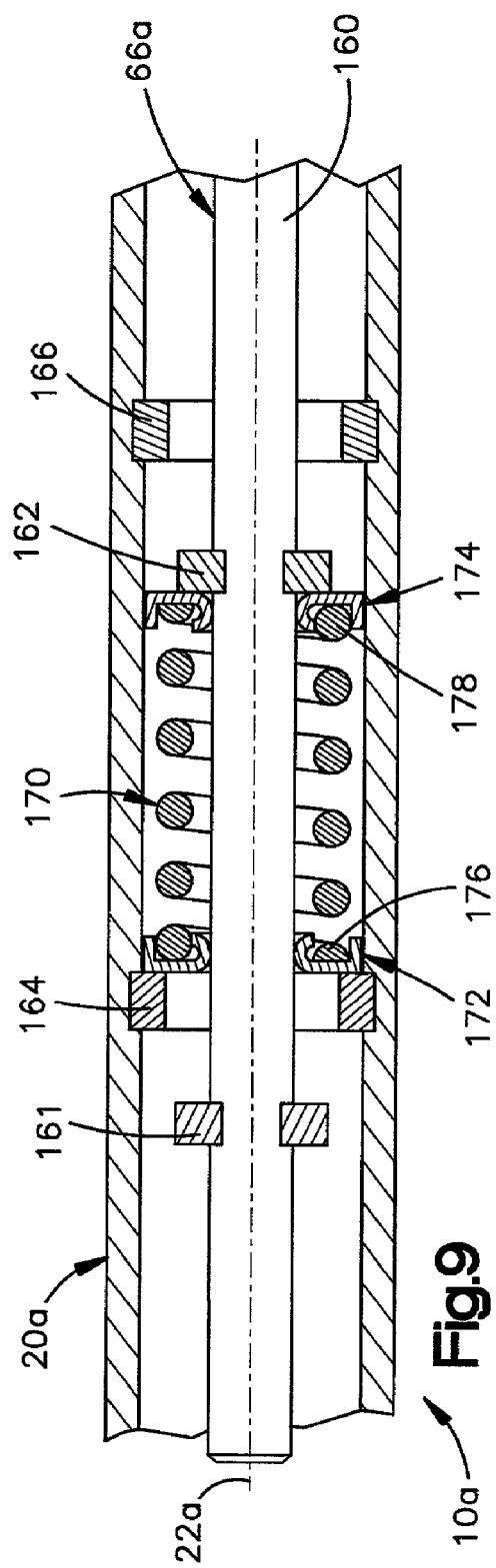

SELF-CENTERING STEERING SYSTEM

BACKGROUND OF THE INVENTION

1. Technical Field

The present invention relates to a steering system for a vehicle, and more specifically to a system that is self-centering upon the occurrence of a predetermined operating condition, such as the cessation of operation of an electric drive motor of the system.

2. Description of the Prior Art

U.S. Pat. No. 6,019,026 discloses a hydraulic power assist rear wheel steering system with a self-centering feature that sets the rear wheels in a straight ahead position upon failure of the system.

U.S. Pat. No. 4,856,606 discloses an electric power assist rear wheel steering system including a rack and pinion gearset.

U.S. Pat. No. 4,683,971 discloses an electric power assist rack and pinion steering system with a center takeoff. The steering system includes a rack and pinion gearset.

U.S. Pat. No. 4,811,813 also discloses an electric power assist rack and pinion steering system with a center takeoff.

SUMMARY OF THE INVENTION

The present invention is a steering system for a vehicle having opposite first and second steerable wheels. The steering system comprises a housing having first and second end portions and an intermediate portion. A steering member having a longitudinal central axis is supported in a chamber in the housing for axial movement relative to the housing. A piston fixed for movement with the steering member has first and second opposite end faces. A first spring member engages the first end face of the piston member and biases the piston member and thereby the steering member in a first axial direction toward a straight ahead position. A second spring member engages the second end face of the piston member and biases the piston member and thereby the steering member in a second axial direction opposite the first axial direction toward the straight ahead position. First steering linkage is connected with the piston member for transmitting movement of the piston member to the first steerable wheel. Second steering linkage is connected with the piston member for transmitting movement of the piston member to the second steerable wheel.

BRIEF DESCRIPTION OF THE DRAWINGS

Further features and advantages of the present invention will become apparent to those skilled in the art to which the present invention relates from a reading of the following detailed description with reference to the accompanying drawings, in which:

FIG. 3 is an enlarged view of a portion of the steering system of FIG. 1, shown in the centered or straight ahead condition;

FIG. 4 is a view similar to FIG. 3 showing the system portion in a turning condition;

FIG. 5 is an enlarged view of an electric motor drive portion of the steering system of FIG. 1;

FIG. 6 is a sectional view taken along line 6-6 of FIG. 5;

FIG. 8 is an enlarged view of a portion of the steering system of FIG. 7, shown in the centered or straight ahead condition;

FIG. 9 is a view similar to FIG. 8 showing the system portion in a turning condition;

DETAILED DESCRIPTION OF THE INVENTION

Figure 1:
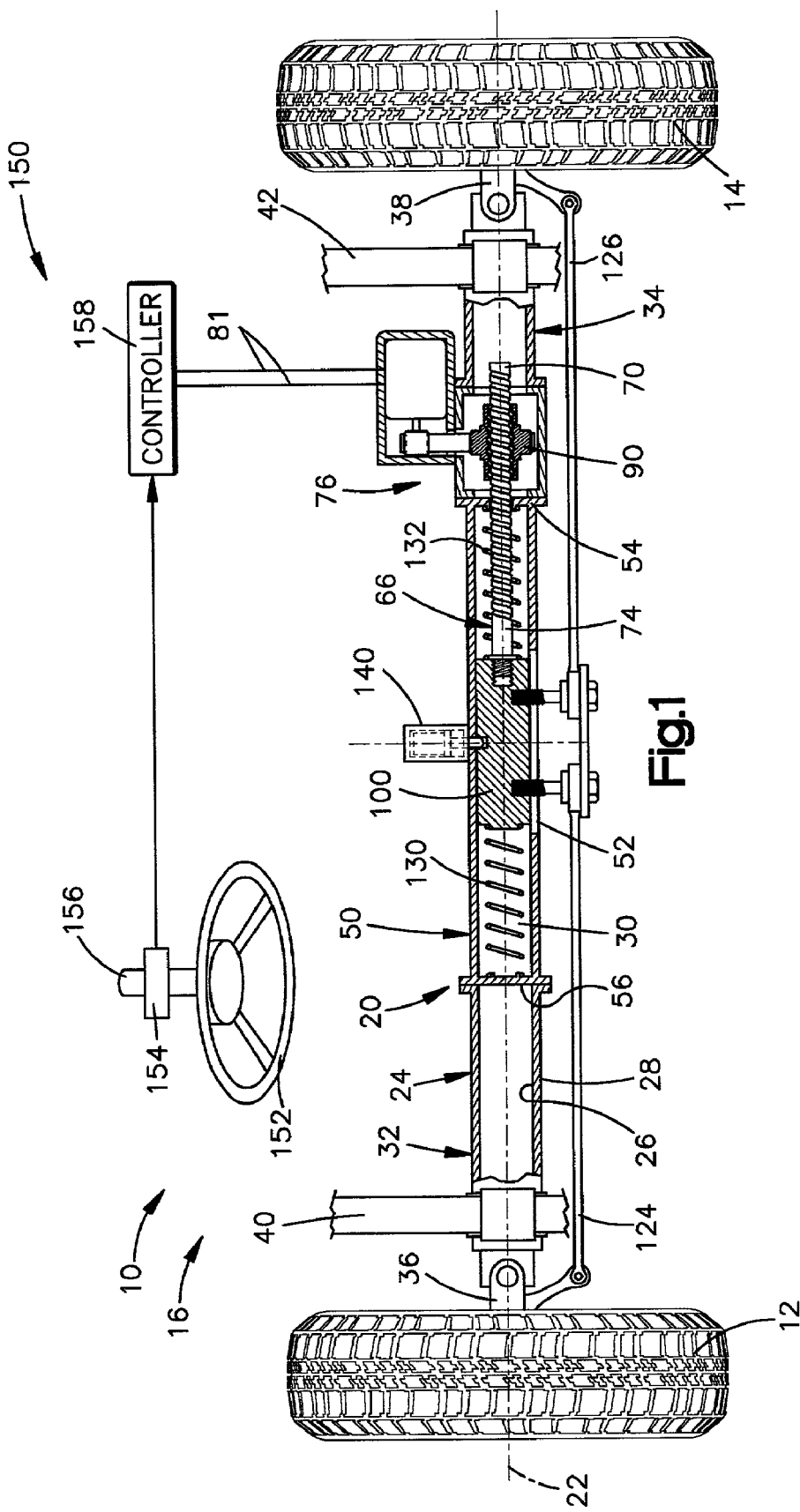
FIG. 1 is a top plan view, partially in section, of a vehicle rear axle and rear wheels including a steering system in accordance with the present invention, shown in a centered or straight ahead condition.

The present invention relates to a steering system for a vehicle, and more specifically to a system that is self-centering upon the occurrence of a predetermined operating condition. The present invention is applicable to various steering system constructions. As representative of the present invention, FIG. 1 illustrates a steering system 10 for steering left and right rear wheels 12 and 14 of a vehicle 16. The present invention is applicable to other types of steering systems, for example, steering systems for steering front wheels of a vehicle.

The steering system 10 includes a housing 20. In the illustrated embodiment, the housing 20 is an axle of the vehicle. Specifically, the axle 20 in the illustrated embodiment is a rear axle of the vehicle 16.

The axle 20 is of the "solid axle" configuration and has a tubular, cylindrical configuration centered on an axis 22. It should be understood that the axle 20 could have a different configuration. The axle 20 comprises a cylindrical wall 24 including parallel, cylindrical inner and outer side surfaces 26 and 28. The axle 20 defines an internal chamber 30. The axle 20 is illustrated as being made form several pieces joined end to end, but could be made as one piece.

The axle 20 has first and second end portions 32 and 34. The first end portion 32 of the axle 20, or left end portion, supports the left rear wheel 12 of the vehicle 16. The vehicle includes one or more control arms or other suspension portions 36 that connect the wheel 12 with the end portion 32 of the axle 20.

The second end portion 34 of the axle 20, or right end portion, supports the right rear wheel 14 of the vehicle 16. The vehicle 16 includes one or more control arms or other suspension portions 38 that connect the wheel 14 with the end portion 34 of the axle 20.

The vehicle also includes left and right springs 40 and 42 connected with the axle 20 that support the axle and the wheels 14 and 16 for vertical movement relative to the vehicle body. Thus, the axle 20 is a device that extends across the vehicle 16 from left to right, and is suspended by the vehicle springs 40 and 42, and supports the left and right wheels 14 and 16.

The axle 20 has an intermediate portion 50 located between the first and second end portions 32 and 34. The axle 20 has a takeoff opening 52 (FIG. 3) in the intermediate portion 50. In the illustrated embodiment, the takeoff opening 52 is a longitudinally extending slot. The takeoff opening 52 communicates with the chamber 30 in the axle 20.

The axle 20 includes first and second internal spring supports 54 and 56 fixed in the chamber 30 on either side of the slot 52. The spring supports 54 and 56 are members that can transmit force from internal springs (described below) of the steering system 10 to the axle 20. The spring supports 54 and 56 may be formed as one piece with the axle 20, or may be separate pieces fixed to the axle 20.

The first spring support 54 is an annular member that extends across the chamber 30 at the location of the first spring support. The first spring support 54 has a central opening 58. The second spring support 56 is a disc-shaped member that extends across the chamber 30 at the location of the second spring support. The spring supports 54 and 56 may be formed as part of and as one piece with, or separately from, the axle 20.

The axle 20 also has a belt opening 60. The belt opening 60 is disposed in the intermediate portion 50, axially outward of the first spring support 54. The belt opening 60 is spaced axially from the takeoff opening 52.

The steering system 10 includes an actuator or steering member 66. The steering member 66 is located in the chamber 30 in the axle 20. The steering member 66 has an elongate, rod-like configuration. The steering member 66 is not as long as the axle 20. The steering member 66 is supported in the intermediate portion 50 of the axle 20 for axial movement relative to the axle.

At one end the steering member 66 has a screw thread portion 70 with an external screw thread 72. The belt opening 60 in the axle 20 is located radially outward of the screw thread portion 70 of the steering member 66. The opposite end portion 74 of the steering member 66 does not have a screw thread on it, but is cylindrical in configuration. There are no rack teeth on the steering member 66.

The steering system 10 includes structure (not shown) for preventing the steering member 66 from rotating in the axle 20. For example, the axle 20 and the steering member 66 may have cooperating flats that block rotation of the steering member in the axle.

The steering system 10 includes an electric motor drive assembly 76 shown schematically in FIGS. 5 and 6. The drive assembly 76 includes an electric motor 78 supported on the axle 20. The motor 78 is located outside of the axle 20, that is, not in the chamber 30 in the axle. The drive assembly 76 is located radially outward of the belt opening 60 in the axle 20. It should be understood that the present invention is applicable to other types of electric motor drives, including ones located in the axle.

The motor 78 has a stator 80 supplied with current through lead wires 81. The stator 80 extends around a rotor 82. An output shaft 84 is fixed for rotation with the rotor 82. External gear teeth may be formed on the shaft 84 itself or, as in the illustrated embodiment, on a gear 86 fixed for rotation with the shaft 84.

The drive assembly 76 also includes an internally toothed drive belt 88. The drive belt 88 is trained around the gear 86 on the output shaft 84 of the motor 78. The drive belt 88 extends through the belt opening 60 in the axle 20 and into the chamber 30 in the axle.

The steering system 10 further includes a ball nut 90 located in the chamber 30 in the axle 20. The ball nut 90 is fixed axially in the axle 20 but is free to rotate in the axle 20. The ball nut 90 is supported by bearings 92 for rotation in the chamber 30. The ball nut 90 is associated with the screw thread portion 70 of the steering member 66. Specifically, the ball nut 90 is threaded on the screw thread portion 70 of the steering member 66. The ball nut 90 supports the one end of the steering member 66 in the axle 20.

The ball nut 90 is externally toothed and the drive belt 88 is trained around the ball nut. As a result, the ball nut 90 is drivingly connected with the electric motor 78, so that the ball nut 90 rotates about the axis 20 upon actuation of the motor 78, through force transmitted by the drive belt 88.

The steering system 10 includes a takeoff assembly 98 (FIGS. 3 and 4). The takeoff assembly 98 includes a carriage or piston member or piston 100. The piston 100 in the illustrated embodiment is a cylindrical metal member supported in the intermediate portion 50 of the axle 20 for axial sliding movement relative to the axle. The piston 100 has a cylindrical, axially extending outer side surface 102 that extends between first and second, radially extending, opposite end surfaces or end faces 104 and 106. The piston 100 has a locking pin opening 112 in the outer surface 102. The locking pin opening 112 is presented radially outward, at a location diametrically opposite the slot 52.

A threaded bore 116 extends through the end face 106 and into the interior of the piston 100. A threaded inner end portion 118 of the steering member 66 is screwed into the bore 116 in the piston 100. As a result, the piston 100 is fixed for sliding movement with the steering member 66 in the axle 20. In addition, the piston 100 supports the steering member 66 in the chamber 30 in the axle 20. Alternatively, the piston 100 can be formed as one piece with the steering member 66, as shown in FIG. 4.

Two bolts 120 and 122 extend radially through the slot 52 in the axle 20 and are screwed into the piston 100. A first steering linkage, such as a left tie rod 124, is connected with the bolt 120. A second steering linkage, such as a right tie rod 126, is connected with the other bolt 122. The left and right tie rods 124 and 126 connect the left and right rear wheels 12 and 14 with the piston 100, so that axial movement of the piston 100 in the axle 20 results in steering movement of the rear wheels 12 and 14.

The steering system 10 includes first and second centering springs 130 and 132. The first spring 130 is a cylindrical compression spring made of wire having a circular cross-sectional configuration. (Although the springs 130 and 132 are illustrated as being metal compression springs, it should be understood that they could be other types of springs, or other types of biasing members.)

Figure 2:
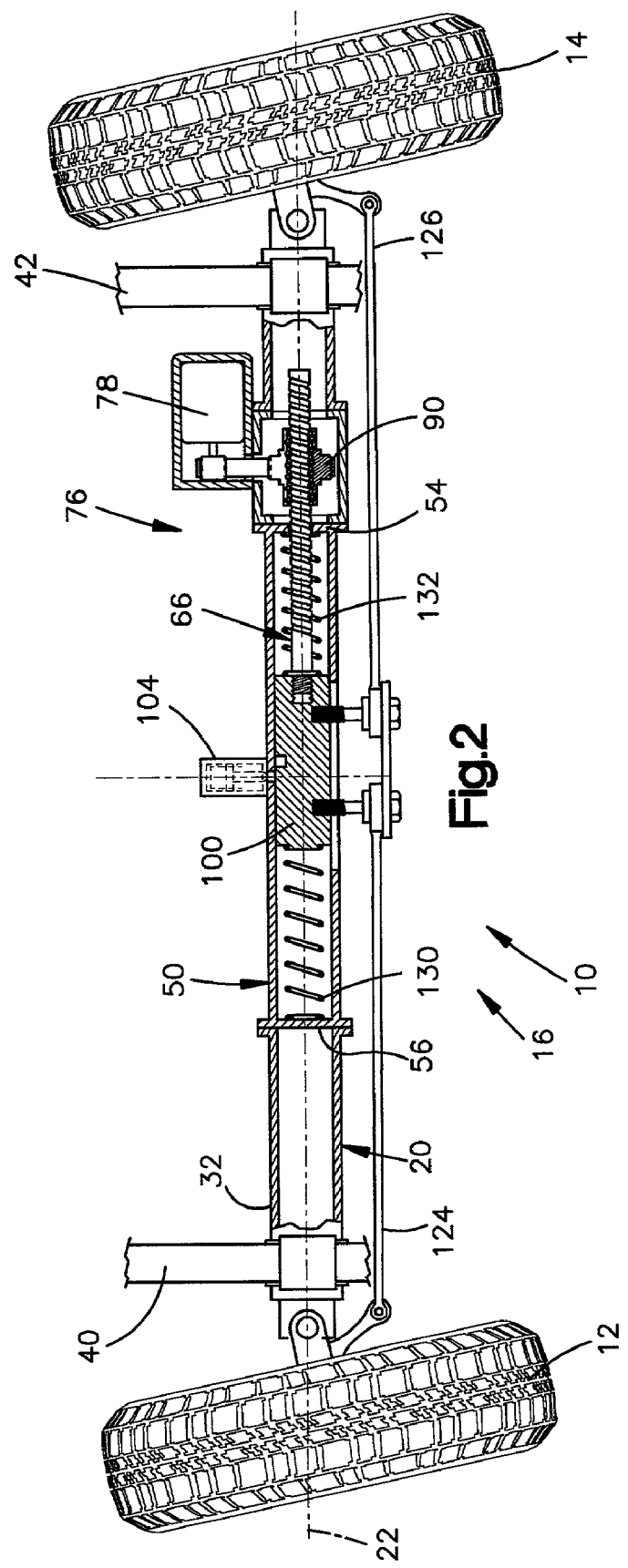
FIG. 2 is a view similar to FIG. 1 showing the steering system of FIG. 1 in a turning condition.

The first spring 130 extends between and engages the end surface 104 of the piston 100 and the second spring support 56 on the axle 20. The first spring 130 acts between the piston 100 and the axle 20 to bias the piston in a direction to the right as viewed in FIG. 2.

The second spring 132 is a cylindrical compression spring made of wire having a circular cross-sectional configuration. The second spring 132 engages and extends between the end surface 106 of the piston 100 and the first spring support 54 on the axle 20. The second spring 132 acts between the piston 100 and the axle 20 to bias the piston in a direction to the left as viewed in FIG. 2.

Thus, the biasing force of the second spring 132 acts on the piston 100 in a direction opposite the biasing force of the first spring 130. The combined resultant force of the first and second springs 130 and 132 acts to move the piston 100 and thus the steering member 66 to a centered or straight ahead position as shown in FIGS. 1 and 3, in the absence of motive force applied to the steering member by the electric motor drive assembly 76 or other forces.

The steering system 10 includes a locking mechanism 140 (FIGS. 3 and 4). The locking mechanism 140 includes a solenoid 142. The solenoid 142 is mounted on the axle 20, diametrically opposite the takeoff opening 52. The solenoid 142 has a locking pin 144 that is movable in a direction toward the axis 20 upon de-energizing of the solenoid. A pin opening 146, in the axle 20, enables the locking pin 144 to move into the chamber 30 in the axle 20 when the solenoid 142 is de-energized.

When the piston 100 is in the centered or straight ahead position, the locking pin opening 112 in the piston 100 is aligned with the pin opening 146 in the axle 20. In this condition, the locking pin 144 of the solenoid 142 is selectively movable into the locking pin opening 112 in the piston 100 to block movement of the piston in the axle 20. In this circumstance, if the solenoid 142 is energized by electric current over lead wires 148, the locking pin 144 is held out of the locking pin opening 112 in the piston 100, and the piston and steering member 66 are movable axially in the axle 20.

The steering system 10 includes a motor control system shown schematically at 150. The motor control system 150 includes the vehicle steering wheel 152. A transducer 154 is connected to the steering column 156 so as to measure the steering angle, and the transducer output is supplied to a controller 158. The controller 158 in turn provides appropriate control signals to the electric motor 78 over the lead wires 81. The controller 158 may alternatively, or in addition, receive inputs from, for example, a vehicle speed sensor, and/or a lateral acceleration sensor, and/or a yaw angular velocity sensor.

In normal operation of the steering system 10, the motor 78 is actuatable by the motor control system 150 to effect steering movement of the rear wheels 12 and 14. When the motor 78 is energized, the output shaft 84 of the motor rotates, transmitting motive force through the drive belt 88 to the ball nut 90. The ball nut 90 rotates, causing the steering member 66 to move axially in the housing 20. The force of movement of the steering member 66 is transmitted through the piston 100, and the bolts 120 and 122, into the tie rods 124 and 126. The tie rods 124 and 126 cause the rear wheels 12 and 14 to pivot in the desired steering action.

There may be instances when the steering system 10 enters a non-driving condition, that is, in which the electric motor drive assembly 76 does not control the steering position of the rear wheels 12 and 14. For example, a component of the motor control system 150, or the motor 78 itself, may be damaged or fail to function as intended, so that proper driving force is no longer provided to the steering member 66. Alternatively, the vehicle 16 may be turned off, de-energizing the motor 78. In these instances of cessation of operation of the electric motor drive assembly 76, it is desirable to move the rear wheels 12 and 14 into the straight ahead condition.

When the system 10 enters such a non-driving condition, the motor control system 150 de-energizes the solenoid 142. As a result, the locking pin 144 of the solenoid 142 moves through the pin opening 146 in the housing 20 and into engagement with the piston 100.

If the wheels 12 and 14 happen to be in the straight ahead position when this occurs, the locking pin opening 112 in the piston 100 is aligned with the pin opening 146 in the housing 20. The locking pin 144 of the solenoid 142 moves through the pin opening 146 in the housing 20 and into the locking pin opening 112 in the piston 100. The engagement of the locking pin 144 in the piston 100 locks the wheels 12 and 14 in the straight ahead condition, as desired.

On the other hand, if the wheels 12 and 14 are not in a straight ahead position when the system 10 enters a non-driving condition, the locking pin opening 112 in the piston 100 is not aligned with the pin opening 146 in the housing 20. Thus, the locking pin 144 of the solenoid 142 moves through the pin opening 146 in the housing 20 and into engagement with the outer side surface 102 of the piston 100. The combined force of the first and second springs 130 and 132 acts to move the piston 100 and thereby the steering member 66 toward the straight ahead position as shown in FIGS. 1 and 3. This movement of the steering member 66 might be abrupt, and it is desirable to dampen it.

The motor control system 150 is operative to dampen this movement. Specifically, such axial movement of the steering member 66 causes the ball nut 90 to rotate in response. The rotation of the ball nut 90 is transmitted through the drive belt 88 into the electric motor 78, causing the rotor 82 of the electric motor to rotate.

The motor control system 150 is arranged so that when the non-driving condition occurs, a circuit is completed across the stator 80 of the motor 78. As a result, this rotation of the rotor 82 generates back EMF in the motor 78 that resists the turning of the rotor 82. The faster the rotor 82 turns, the greater is the amount of resistive force (back EMF). This resistive force acts to slow the rate of movement of the steering member 66 back to the straight ahead position. Thus, the motor 78 acts as a speed limiter on the return centering movement of the steering member 66.

Figure 7:
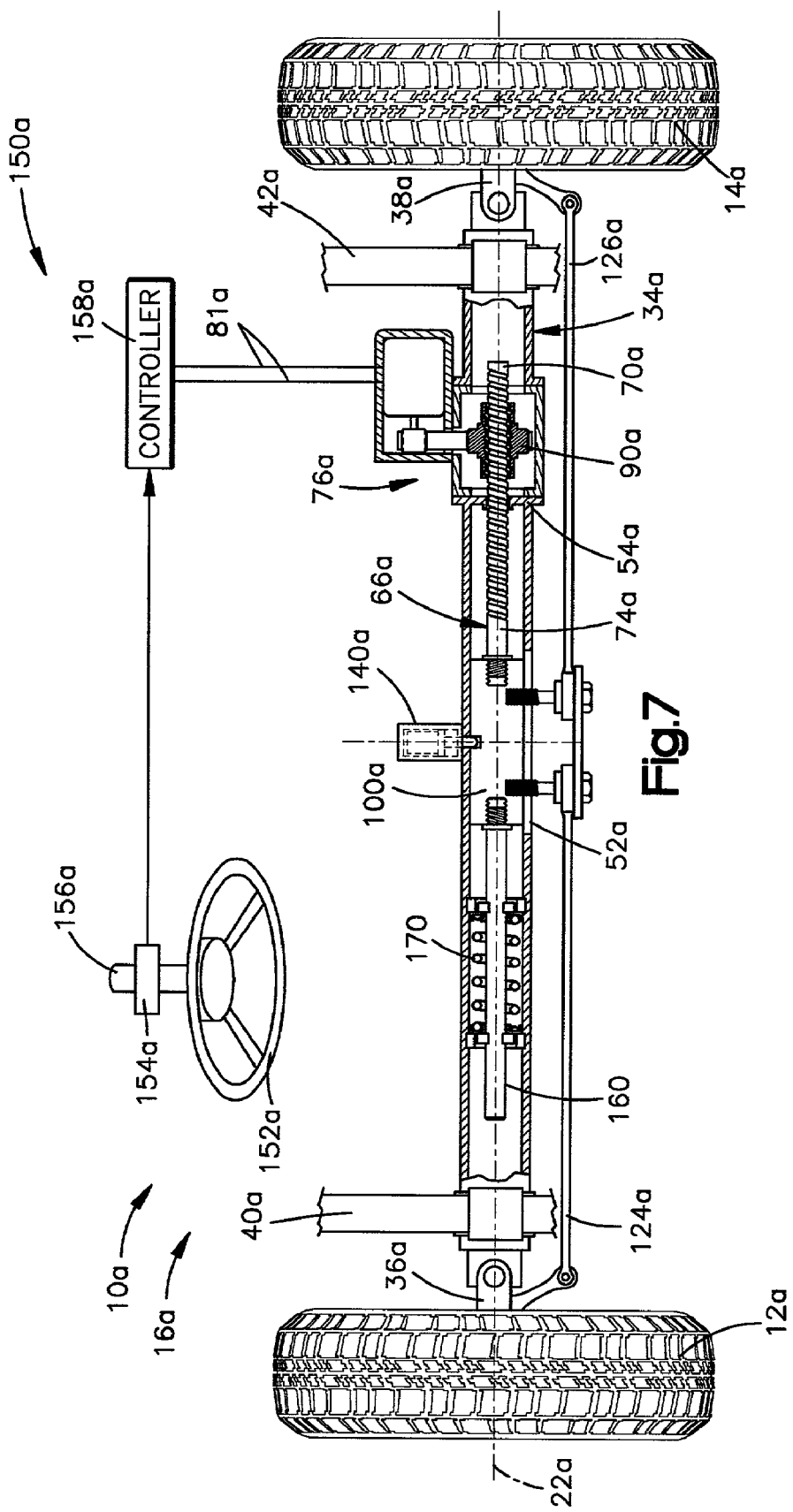
FIG. 7 is a view similar to FIG. 1 of a steering system in accordance with a second embodiment of the invention, shown in a centered or straight ahead condition.
Figure 10:
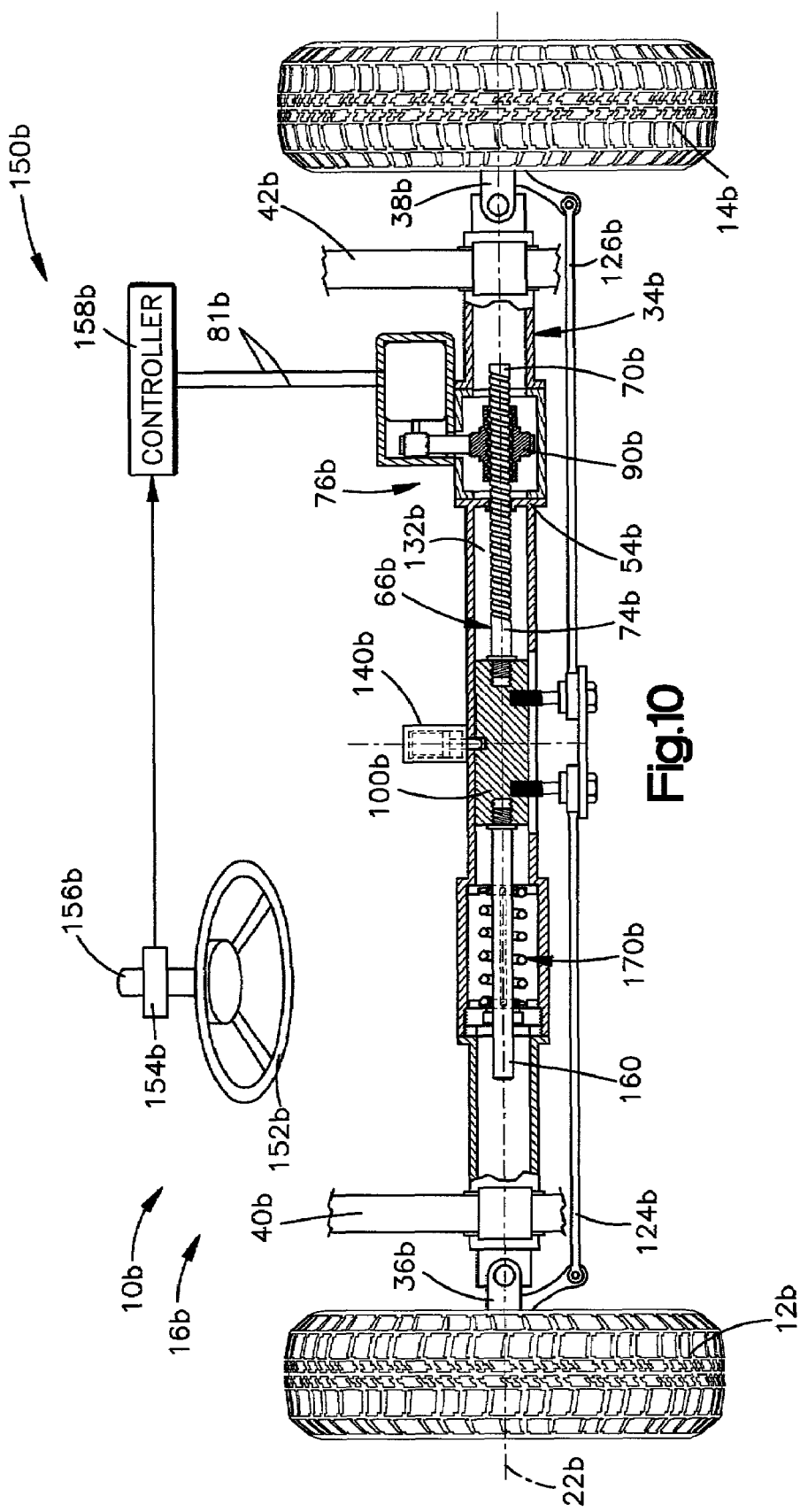
FIG. 10 is a view similar to FIG. 1 of a steering system in accordance with a third embodiment of the invention, shown in a centered or straight ahead condition.

FIGS. 7-9 illustrate a steering system 10*a* in accordance with a second embodiment of the invention, in which the takeoff assembly is centered by one spring, not by two springs. The steering system 10*a* is similar in construction to the steering system 10 (FIGS. 1-6), and parts that are the same or similar, or that have similar functions, are given the same reference numerals with the suffix "a" attached.

In the steering system 10*a*, the steering member 66*a* (FIG. 7) is fixedly secured to the right hand end (as viewed in the drawings) of the piston 100*a*. An extension portion 160 of the steering member 66*a* is fixedly secured to the opposite end of the piston 100*a* and projects from the piston in a direction away from the belt drive assembly 76*a*. Left and right stops 161 and 162 are fixed to the steering member portion 160 at spaced locations. The stops 161 and 162 may be snap rings that fit into grooves formed in the surface of the steering member portion. The stops 161 and 162 may be formed in another manner.

When the steering system 10*a* is in the straight ahead condition shown in FIGS. 7 and 8, the steering member stops 161 and 162 (FIG. 8) are located radially inward of a corresponding pair of left and right stops 164 and 166 on the housing 20*a*. The housing stops 164 and 166 also may be formed by snap rings received in grooves in the inner surface of the tubular housing, or in another manner. The housing stops 164 and 166 have an inside diameter large enough to allow the steering member stops 161 and 162 to pass freely through the housing stops upon axial movement of the steering member 66*a* relative to the housing 20*a*.

A single spring 170, and a pair of spring end caps 172 and 174, are located on the steering member portion 160, between the steering member stops 161 and 162. The spring 170 is a compression spring having a first end portion 176 received in the left spring end cap 172, and an opposite second end portion 178 received in the right spring end cap 174. The left spring end cap 172 is crimped on the first end portion 176 of the spring 170 and is thus movable with the first end portion of the spring. The right spring end cap 174 is crimped on the second end portion 178 of the spring 170 and is thus movable with the second end portion of the spring. The steering member portion 160 extends axially through the open center of the spring 170 and through the spring end caps 172 and 174.

The inner and outer diameters of the spring end caps 172 and 174 are selected so that they are captured between the steering member stops 161 and 162 and also between the housing stops 164 and 166. Specifically, the outer diameter of the spring end caps 172 and 174 is greater than the inner diameter of the housing stops 164 and 166. As a result, the spring end caps 172 and 174 can not move axially out of the space between the housing stops 164 and 166. Therefore, the spring 170 can not move axially out of the space between the housing stops 164 and 166.

Also, the inner diameter of the spring end caps 172 and 174 is less than the outer diameter of the steering member stops 161 and 162. As a result, the spring end caps 172 and 174 can not move axially out of the space between the steering member stops 161 and 162. Therefore, the spring 170 can not move axially out of the space between the steering member stops 161 and 162.

The spring 170 is compressible between the steering member stops 161 and 162 and the housing stops 164 and 166. For example, FIG. 8 illustrates a centered condition of the steering system 10a, and FIG. 9 illustrates an off-center condition of the steering system 66a. In the off-center condition shown in FIG. 9, the steering member 66a is moved axially to the left (as viewed in FIG. 9) relative to the housing 20a by steering force applied by the belt drive assembly 76a. The right steering member stop 162 pushes on the right spring end cap 174 and compresses the spring 170 axially against the left housing stop 164. The right spring end cap 174 and the right end portion 178 of the spring 170 are moved away from the right housing stop 166. The biasing force of the spring 170 resists but does not prevent the movement of the steering member 66a in the leftward direction.

If the steering force applied to the steering member 66a by the belt drive assembly 76a is, thereafter, terminated, the biasing force of the compressed spring 170 causes the right spring end cap 174 to push against the right steering stop 162. This force is transmitted to the steering member 66a and moves the steering member back toward the centered condition shown in FIGS. 7 and 8. The centering movement of the steering member 66a stops when the right spring end cap 174 engages the right housing stop 166. In this position, the steering member 66a is centered in the axle (housing 20a), so that the steerable wheels 12a and 14a do not impart steering force to the vehicle 16a.

If the steering member 66a is moved axially to the right (as viewed in FIG. 11) relative to the housing 20a, the left steering member stop 161 pushes on the left spring end cap 172 and compresses the spring 170 axially against the right housing stop 166. The left spring end cap 172 and the left end portion 176 of the spring 170 are moved away from the left housing stop 164. The biasing force of the spring 170 resists but does not prevent the movement of the steering member 66a in the rightward direction.

FIGS. 10-13 illustrate a steering system 10b in accordance with a second embodiment of the invention. In the steering system 10b, as in the steering system 10a, the takeoff assembly is centered by one spring, not by two springs. The steering system 10b is similar in construction to the steering system 10a (FIGS. 7-9), and parts that are the same or similar, or that have similar functions, are given the same reference numerals with the suffix "b" used.

In the steering system 10b, the steering member 66b is fixedly secured to the right hand end (as viewed in the drawings) of the piston 100b. An extension portion 160b of the steering member 66b is fixedly secured to the opposite end of the piston 100b and projects from the piston in a direction away from the belt drive assembly 76b.

The steering member portion has a pair of grooves, or slots, 180 and 182 in its outer surface 184. The slots 180 and 182 extend axially along the steering member surface 184 at diametrically opposite locations. The right hand end (as viewed in FIGS. 11 and 12) of the one slot 180 is defined by a stop surface 186 on the steering member portion 160b. The opposite left hand end (as viewed in FIGS. 11 and 12) of the slot 180 is defined by a stop surface 188 on the steering member portion 160b. Similarly, the other slot 182 has stop surfaces (not shown) that define its right and left hand ends.

A single spring 170b, and a pair of spring end caps 172b and 174b, are located on the steering member portion 160b, between the stop surfaces 186 and 188 on the steering member. The spring 170b is a compression spring having a first or left end portion 176b received in the left spring end cap 172b, and an opposite second or right end portion 178b received in the right spring end cap 174b.

Figure 12:
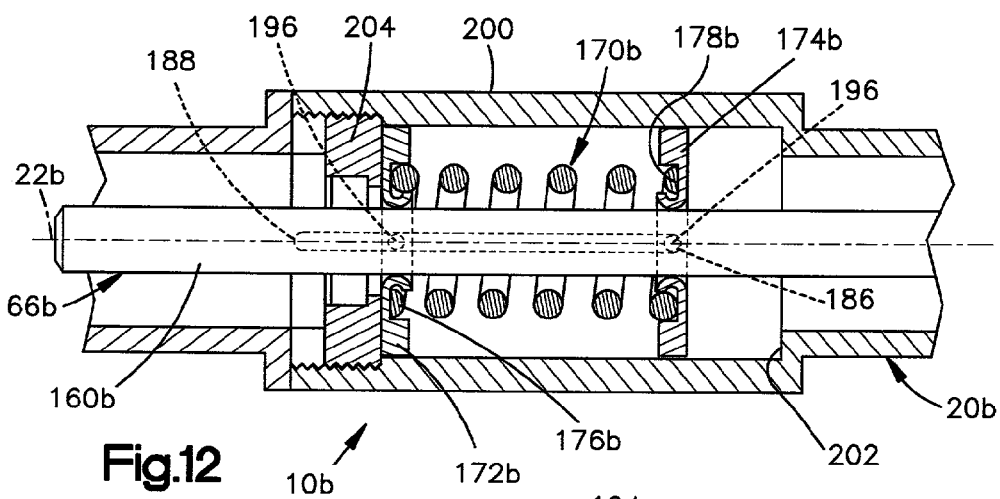
FIG. 12 is a view similar to FIG. 11 showing the system portion in a turning condition.
Figure 13:
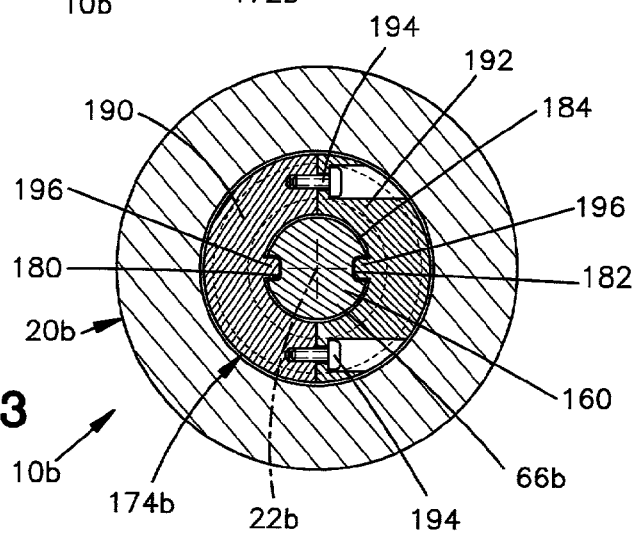
FIG. 13 is a sectional view of the steering system of FIGS. 10-12, taken along line 13-13 of FIG. 11.

The right spring end cap 174b (FIG. 13) is an assembly of two cap halves 190 and 192 fastened together on the right end portion 178b of the spring 170b with a pair of screws 194 (shown only in FIG. 13). The right spring end cap 174b is movable with the first end portion 178b of the spring 170b. Each one of the cap halves 190 and 192 includes a respective rib or pin 196 that projects radially inward toward the axis 22b. When the right spring end cap 174b is fitted on the steering member 66b, the rib 196 on the one cap half 190 fits into the one slot 180 on the steering member, and the rib on the other cap half 190 fits into the other slot 182 on the steering member. The ribs 196 are engageable with the stop surfaces 186 on the right end of the slots 180 and 182, to limit movement of the spring 170b in a direction to the right as viewed in FIG. 12.

The left spring end cap 172b, similarly, is a two part assembly fastened on the left end portion 176b of the spring 170b with a pair of screws (not shown). The left spring end cap 172b is thus movable with the left end portion 176b of the spring 170b. The left spring end cap 172b has two ribs (not shown) that are received in the slots 180 and 182 on the steering member 66b. The ribs are engageable with the stop surfaces at the left ends of the slots 180 and 182, to limit movement of the spring 170b in a direction to the left as viewed in FIG. 12. The spring 170b normally acts with an axially outwardly directed force to urge the left and right spring end caps 172b and 174b against the stop surfaces 188 and 186, respectively.

The housing 20b has a widened portion 200 for receiving the assembly of the spring 170b and the end caps 172b and 174b. The housing 20b has a housing stop surface 202 that defines one end of the widened portion 200. A spanner nut 204 is screwed into the housing 20b at the opposite end of the widened portion 200. The assembly of the spring 170b and the end caps 172b is captured between the spanner nut 204, on the one end, and the housing stop surface 202, on the other end. The spanner nut 204 thus acts as a housing stop portion opposite the stop surface 202. The steering system 10b may also include a bearing or bushing (not shown) for supporting the steering member portion 66b for movement relative to the housing 20b and for blocking rotation of the steering member relative to the housing.

Figure 11:
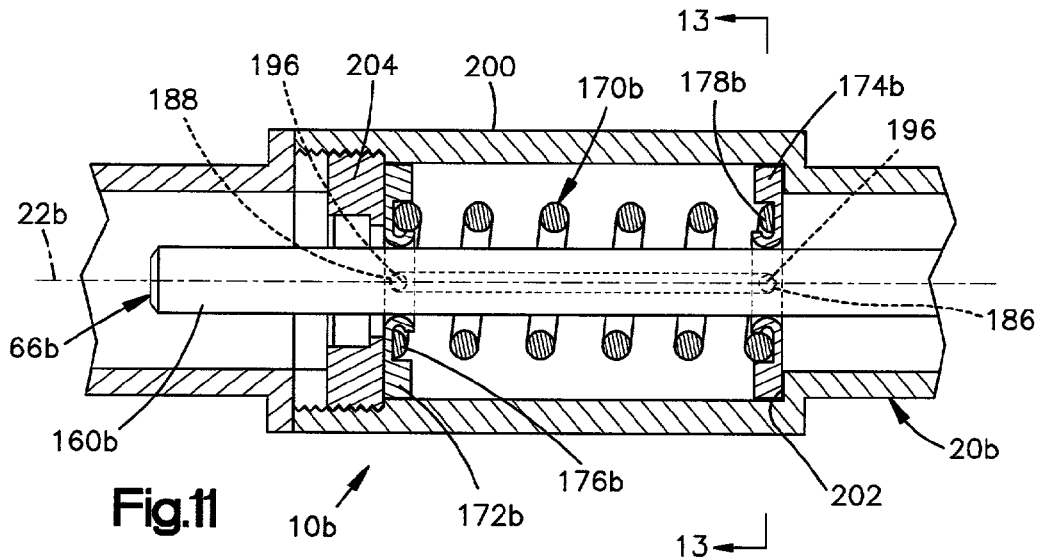
FIG. 11 is an enlarged view of a portion of the steering system of FIG. 10, shown in the centered or straight ahead condition.

The spring 170b is compressible between the steering member stop surfaces 186 and 188 and the housing stop portions 202 and 204. FIG. 11 illustrates a centered condition of the steering system 10b, and FIG. 12 illustrates an off-center condition of the steering system. In the off-center condition shown in FIG. 12, the steering member 66b is moved axially to the left (as viewed in FIG. 12) relative to the housing 20b by steering force applied by the belt drive assembly 76b. The stop surfaces at the right ends of the slots 180 and 182 in the steering member 66b, including the stop surface 186, push on the right spring end cap 174*b* and compress the spring 170*b* axially against the left spring end cap 172*b*. The right spring end cap 174*b* and the right end portion 178*b* of the spring 170*b* move, with the steering member 66*b*, away from the right housing stop surface 202. The biasing force of the spring 170*b* resists but does not prevent the movement of the steering member 66*b* in the leftward direction.

If the steering force applied to the steering member 66*b* by the belt drive assembly 76*b* is, thereafter, terminated, the biasing force of the compressed spring 170*b* causes the right spring end cap 174*b* to push against the right stop surfaces on the steering member 66*b*, including the stop surface 186. This force is transmitted to the steering member 66*b* and moves the steering member back toward the centered condition shown in FIG. 11. The centering movement of the steering member 66*b* stops when the right spring end cap 174*b* engages the right housing stop surface 202. In this position, the steering member 66*b* is centered in the axle (housing 20*b*), so that the steerable wheels 12*b* and 14*b* do not impart steering force to the vehicle 16*b*.

If the steering member 66*b* is moved axially to the right (as viewed in FIG. 11) relative to the housing 20*b*, the left steering member stop surfaces, including the stop surface 188, push on the left spring end cap 172*b* and compress the spring 170*b* axially against the right spring end cap 174*b* and the right housing stop surface 202. The left spring end cap 172*b* and the left end portion 176*b* of the spring 170*b* move with the steering member 66*b* away from the left housing stop (spanner nut 204). The biasing force of the spring 170*b* resists but does not prevent movement of the steering member 66*b* in the rightward direction.

From the above description of the invention, those skilled in the art will perceive improvements, changes and modifications in the invention. For example, features of one embodiment may be combined with features of another embodiment, as suitable. Such improvements, changes and modifications within the skill of the art are intended to be covered by the appended claims.

Having described the invention, we claim:

1. A steering system for a vehicle having first and second steerable wheels, said steering system comprising:
    an axle having first and second end portions which are suspended by springs and which support the first and second steerable wheels of the vehicle, said axle having an intermediate portion which at least partially defines a chamber through which a longitudinal central axis of said axle extends, said first steerable wheel being pivotally mounted on said first end portion of said axle for pivotal movement about a first pivot axis which extends transverse to the longitudinal central axis of said axle, said second steerable wheel being pivotally mounted on said second end portion of said axle for pivotal movement about a second pivot axis which extends transverse to the longitudinal central axis of said axle;
    a steering member having a longitudinal central axis, said steering member being supported in said chamber in said axle for movement along a linear path relative to said axle, said steering member having a screw thread portion disposed between first and second ends of said steering member;
    a ball nut associated with said screw thread portion of said steering member and disposed in said chamber in said axle;
    an electric motor connected with said axle;
    at least one drive member connected with said electric motor and said ball nut to rotate said ball nut to move said steering member in said chamber in said axle upon actuation of said electric motor;
    a takeoff assembly connected to said first end of said steering member and having a portion projecting from an opening in said intermediate portion of said axle, said takeoff assembly being movable with said steering member along the linear path upon rotation of said ball nut;
    first steering linkage connected with said projecting portion of said takeoff assembly and extending along an outer side of said axle to transmit movement from said takeoff assembly to said first steerable wheel upon movement of said steering member and said takeoff assembly along the linear path, said first steering linkage being pivotally connected to said first steerable wheel to effect pivotal movement of said first steerable wheel about said first pivot axis upon movement of said steering member and said takeoff assembly along the linear path; and
    second steering linkage connected with said projecting portion of said takeoff assembly and extending along the outer side of said axle to transmit movement of said takeoff assembly to said second steerable wheel upon movement of said steering member and said takeoff assembly along the linear path, said second steering linkage being pivotally connected to said second steerable wheel to effect pivotal movement of said second steerable wheel about said second pivot axis upon movement of said steering member and said takeoff assembly along the linear path.

2. A steering system as set forth in claim 1 further comprising a spring assembly disposed in said chamber in said axle, said spring assembly biasing said steering member toward a straight ahead position.

3. A steering system as set forth in claim 1 further comprising a spring assembly disposed in said chamber in said axle, said spring assembly comprises a single spring acting to bias said steering member toward a straight ahead position when said steering member is moved from the straight ahead position.

4. A steering system as set forth in claim 3 wherein fixed stops are disposed in said chamber in said axle and capture said spring between said fixed stops when said steering member is in the straight ahead position, said steering member having movable stops that are movable relative to said fixed stops to compress said spring upon movement of said steering member from the straight ahead position.

5. A steering system as set forth in claim 1 further comprising a spring assembly disposed in said chamber in said axle, said takeoff assembly comprising a piston located between said ball nut and said spring assembly, said spring assembly being effective to urge said takeoff assembly toward a straight ahead position.

6. A steering system as set forth in claim 5 further comprising stop means spaced apart from said piston and acting between a spring in said spring assembly and said steering member for transmitting biasing force of said spring to said steering member.

7. A steering system as set forth in claim 1 further including a first spring member acting between said takeoff assembly and said axle, said first spring member biasing said takeoff assembly and thereby said steering member in a first axial direction toward a straight ahead position, and a second spring member acting between said takeoff assembly and said axle, said second spring member biasing said takeoff assembly and thereby said steering member in a second axial direction opposite the first axial direction and toward the straight ahead position.

8. A system as set forth in claim 1 wherein said takeoff assembly includes a piston member connected with said steering member and supported in said axle for movement with said steering member relative to said axle, said piston member having axially opposed first and second end surfaces, a first spring member acting between said first end surface of said takeoff assembly and said axle, and a second spring member acting between said second end surface of said takeoff assembly and said axle.

9. A steering system as set forth in claim 1 further comprising a motor control system operative to enable the generation of back EMF in said motor upon movement of said steering member toward the straight ahead position in order to resist movement of said steering member toward the straight ahead position.

10. A steering system as set forth in claim 1 wherein said electric motor is located outside said chamber in said axle, said drive member extends through an opening formed in said axle.

11. A steering system as set forth in claim 1 wherein said steering member is free of rack teeth.

12. A steering system as set forth in claim 1 wherein said electric motor is effective to resist movement of said steering member toward a straight ahead position.

13. A system as set forth in claim 1 further comprising a locking member for locking said steering member in a straight ahead position.

14. A steering system as set forth in claim 1 wherein said drive member is a belt which extends part way around said ball nut and part way around an output member connected with said electric motor.

15. A steering system for a vehicle having first and second steerable wheels, said steering system comprising:

an axle having first and second end portions which are suspended by springs and which support the first and second steerable wheels of the vehicle, said axle having an intermediate portion which at least partially defines a chamber through which a longitudinal central axis of said axle extends, said first steerable wheel being pivotally mounted on said first end portion of said axle for pivotal movement about a first pivot axis which extends transverse to the longitudinal central axis of said axle, said second steerable wheel being pivotally mounted on said second end portion of said axle for pivotal movement about a second pivot axis which extends transverse to the longitudinal central axis of said axle;

a steering member having a longitudinal central axis, said steering member being supported in said chamber in said axle for axial movement along a linear path relative to said axle, said steering member being movable between a straight ahead position and positions offset from the straight ahead position of said steering member, said steering member having a screw thread portion;

a spring assembly disposed in said chamber in said axle and connected with said steering member, said spring assembly being effective to provide force which urges said steering member toward the straight ahead position when said steering member is in a position offset from the straight ahead position;

a ball nut associated with said screw thread portion of said steering member and disposed in said chamber in said axle;

an electric motor connected with said axle;

at least one drive member connected with said electric motor and said ball nut to rotate said ball nut to move said steering member away from the straight ahead position against the influence of force provided by said spring assembly upon actuation of said electric motor;

a motor control system connected with said electric motor and operative to enable generation of back EMF in said electric motor upon movement of said steering member toward the straight ahead position under the influence of said spring assembly, said back EMF generated in said electric motor being effective to oppose movement of said steering member toward the straight ahead position under the influence of force provided by said spring assembly, a takeoff assembly connected to said steering member having a portion projecting from an opening in said intermediate portion of said axle, said takeoff assembly being movable with said steering member along the linear path upon rotation of said ball nut;

first steering linkage connected with said projecting portion of said takeoff assembly and extending along an outer side of said axle to transmit movement from said takeoff assembly to said first steerable wheel, said first steering linkage being pivotally connected to said first steerable wheel to effect pivotal movement of said first steerable wheel about said first pivot axis upon movement of said steering member and said chamber in said axle; and second steering linkage connected with said projecting portion of said takeoff assembly and extending along the outer side of said axle to transmit movement of said takeoff assembly to said second steerable wheel, said second steering linkage being pivotally connected to said second steerable wheel to effect pivotal movement of said second steerable wheel about said second pivot axis upon movement of said steering member in said chamber in said axle.

16. A steering system as set forth in claim 15 wherein said first and second ends of said steering member are disposed in said chamber in said axle.

17. A steering system as set forth in claim 15 wherein said electric motor is located outside said chamber in said axle, said drive member extends through an opening formed in said axle.

18. A steering system as set forth in claim 15 wherein said steering member is free of rack teeth.

19. A steering system as set forth in claim 15 wherein said takeoff assembly is connected to a first end of said steering member for movement therewith along a linear path.

20. A steering system as set forth in claim 15 wherein said spring assembly includes only a single spring acting to bias said steering member toward the straight ahead position when said steering member is in one of said positions offset from the straight ahead position.

21. A steering assembly as set forth in claim 15 wherein said spring assembly includes a first spring member acting between said takeoff assembly and said axle and a second spring member acting between said takeoff assembly and said axle.

* * * * *